United States Patent
Huang et al.

(10) Patent No.: US 8,369,396 B2
(45) Date of Patent: Feb. 5, 2013

(54) COMMUNICATION SIGNAL RECEIVER AND SIGNAL PROCESSING METHOD THEREOF

(75) Inventors: Liang-Wei Huang, Taipei (TW); Tzu-Han Hsu, Kaohsiung (TW); Shieh-Hsing Kuo, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 381 days.

(21) Appl. No.: 12/783,538

(22) Filed: May 19, 2010

(65) Prior Publication Data
US 2010/0316112 A1 Dec. 16, 2010

(30) Foreign Application Priority Data
Jun. 15, 2009 (TW) .................................. 98119912

(51) Int. Cl.
*H04L 27/01* (2006.01)

(52) U.S. Cl. .................. 375/233; 375/341; 375/350

(58) Field of Classification Search .............. 375/233, 375/341, 350
See application file for complete search history.

(56) References Cited

U.S. PATENT DOCUMENTS

| | | | |
|---|---|---|---|
| 6,226,323 B1* | 5/2001 | Tan et al. | 375/233 |
| 6,426,972 B1* | 7/2002 | Endres et al. | 375/229 |
| 6,760,372 B1* | 7/2004 | Zortea et al. | 375/232 |
| 7,272,177 B2 | 9/2007 | Lin | |
| 7,453,935 B2 | 11/2008 | Agazzi | |
| 2004/0169945 A1* | 9/2004 | Hiura et al. | 360/39 |
| 2006/0133540 A1* | 6/2006 | Eglit | 375/324 |
| 2009/0168934 A1* | 7/2009 | Huang et al. | 375/354 |
| 2009/0196335 A1* | 8/2009 | Huang et al. | 375/230 |
| 2012/0134406 A1* | 5/2012 | Huang et al. | 375/232 |

FOREIGN PATENT DOCUMENTS

| | | |
|---|---|---|
| CN | 1612477 A | 5/2005 |
| JP | 2002152090 A | 5/2002 |

* cited by examiner

*Primary Examiner* — Shuwang Liu
*Assistant Examiner* — Michael Neff
(74) *Attorney, Agent, or Firm* — Winston Hsu; Scott Margo

(57) ABSTRACT

A communication signal receiver includes an adder, a slicer, and an infinite impulse response (IIR) filter. The adder performs an addition on a first signal and a filtered signal to generate an output signal. The slicer performs a hard decision on the output signal to generate a detecting result. The IIR filter is coupled to the slicer and the adder for processing the output signal to generate the filtered signal. The communication signal receiver further includes a decoder. The decoder receives and decodes the output signal to generate a decoded output signal, wherein the decoder is a Viterbi decoder.

12 Claims, 3 Drawing Sheets

COMMUNICATION SIGNAL RECEIVER AND SIGNAL PROCESSING METHOD THEREOF

BACKGROUND OF THE INVENTION

1. Field of the Invention

The present invention relates to a communication signal receiver and a related signal processing method, and more particularly, to a method and apparatus utilizing an infinite impulse response (IIR) to replace a feedback equalizer (FE), for decreasing the complexity of a backend decoder and improving the efficiency of the whole system.

2. Description of the Prior Art

A conventional communication signal receiver usually includes the following functional blocks: a matched filter, a timing recovery circuit, an equalizer, an interference canceller and a decoder. The above-mentioned functional blocks need to be operated with proper parameters. The signal receiver may utilize a data-aided method to find the proper parameters via known data transmitted from a corresponding transmitter. However, the IEEE 802.3 Standard does not adjust these functional blocks by transmitting known data. Therefore, the adjusting of the parameters needs to be utilized through a decision-directed method.

At present, a conventional equalizer commonly contains a liner feed-forward equalizer (LE) and a decision feedback equalizer (DFE), wherein the DFE usually includes a feed-forward filter and a feedback filter. The DFE can effectively cancel the post-cursor component of the signal, but it cannot sufficiently prevent the error propagation phenomenon, thereby the system performance is deeply affected.

If a Viterbi decoder is directly connected to an output of the DFE, the decoding capability of the Viterbi decoder will also be deeply affected by the error propagation. There are several published works about reducing the error propagation and the related solutions have been disclosed in U.S. Pat. No. 7,272,177 and U.S. Pat. No. 7,453,935, etc. Referring to U.S. Pat. No. 7,272,177, a decision feedback sequence estimator (DFSE) is utilized to detect the data transmitted from the DFE, but the parameters of the FE need to be provided to the DFSE. Additionally, a tentative decision is needed to provide the slicer error to adjust the afore-mentioned blocks. Therefore, a tentative decision composed by an FE and a slicer is implemented with a DFSE, for providing the parameters of the FE to the DFSE. In this prior art, the error propagation phenomenon can be decreased, but the complexity of the system will be increased by a significant degree, and the Viterbi decoder cannot derive a best decoding gain (i.e., a best solution of the Maximum likelihood sequence estimation (MLSE)). U.S. Pat. No. 7,453,935 only adopts one FE, which decreases the cost resulting from the implementation of an FE, but makes the backend processing become very complicated.

SUMMARY OF THE INVENTION

One object of the present invention is to provide a communication signal receiver and a related signal processing method, to solve the above mentioned problems.

According to an embodiment of the present invention, a communication signal receiver is disclosed. The communication signal receiver includes an adder, a slicer, and an infinite impulse response (IIR) filter. The adder performs an addition on a first signal and a filtered signal to generate an output signal. The slicer performs a hard decision on the output signal to generate a detecting result. The IIR filter is coupled to the slicer and the adder for processing the output signal to generate the filtered signal. The communication signal receiver further includes a decoder. The decoder receives and decodes the output signal to generate a decoded output signal, wherein the decoder is a Viterbi decoder.

According to another embodiment of the present invention, a signal processing method employed in a communication signal receiver is disclosed. The communication signal receiver includes an IIR filter. The signal processing method includes the following steps: performing an addition on a first signal and a filtered signal to generate an output signal; performing a hard decision on the output signal to generate a detecting result; and processing the output signal by the IIR filter to generate the filtered signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
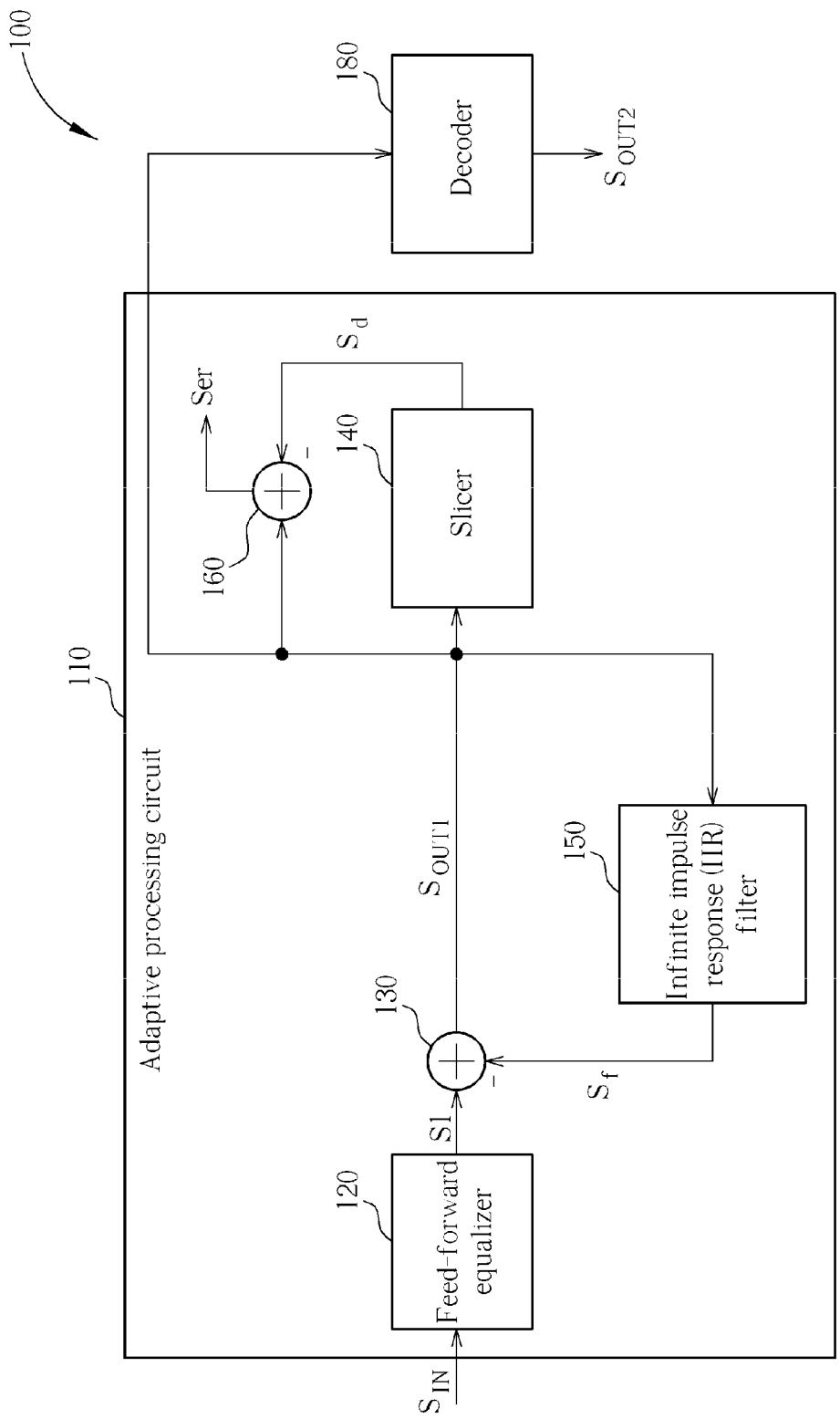
FIG. 1 is a diagram of a communication signal receiver according to a first embodiment of the present invention.

FIG. 1 is a diagram of a communication signal receiver 100 according to a first embodiment of the present invention. As shown in FIG. 1, the communication signal receiver 100 includes an adaptive processing circuit 110 and a decoder 180. In this embodiment, the adaptive processing circuit 110 can be a decision feedback equalizer (DFE); however, this is for illustrative purposes only, and by no means serves as a limitation to the scope of the present invention. Implementing the adaptive processing circuit 110 by another type of processing circuit also falls within the scope of the present invention. The adaptive processing circuit 110 includes, but is not limited to, a feed-forward equalizer 120, a first adder 130, a slicer 140, an infinite impulse response (IIR) filter 150 and a second adder 160.

The feed-forward equalizer 120 receives an input signal $S_{IN}$ and generates a first signal S1 according to the input signal $S_{IN}$, such as cancelling the pre-cursor component of the input signal $S_{IN}$ to thereby generate the first signal S1. The first adder 130 is coupled to the feed-forward equalizer 120, the slicer 140 and the IIR filter 150, for performing an addition on the first signal S1 and a filtered signal $S_f$ to generate an output signal $S_{OUT1}$. The slicer 140 is coupled to the first adder 130, for performing a hard decision on the output signal $S_{OUT1}$ to generate a detecting result Sd. The second adder 160 is coupled to the slicer 140, for performing an addition on the output signal $S_{OUT1}$ and the detecting result Sd to generate an error signal Ser. The IIR filter 150 is coupled to the slicer 140 and the first adder 130, for processing the output signal $S_{OUT1}$ to generate the filtered signal $S_f$, such as cancelling the post-cursor component of the output signal $S_{OUT1}$ to thereby generate the filtered signal $S_f$. In addition, a decoder 180 is coupled to the adaptive processing circuit 110, for receiving and decoding the output signal $S_{OUT1}$ to generate a decoded output signal $S_{OUT2}$.

In this embodiment, the decoder 180 might be a Viterbi decoder; however, this by no means serves as a limitation to the scope of the present invention. The communication signal receiver 100 can be applied in a 1Gbase-T system or a 10Gbase-T system; however, this is not a limitation to the present invention, and the communication signal receiver 100 can also be applied in other network systems.

The error signal Ser generated by performing an addition on the output signal $S_{OUT1}$ and the detecting result Sd can be used to adjust the parameters of the functional blocks such as a matched filter, a timing recovery circuit, an equalizer and an interference canceller (not shown in FIG. 1) in the communication signal receiver 100. As the operations of the functional blocks are well-known to those skilled in the art, a detailed description is omitted here for the sake of brevity.

As shown in FIG. 1, the exemplary communication signal receiver 100 of the present invention utilizes the IIR filter 150 to replace the conventional feedback equalizer (FE). The signal input to the conventional FE is the detecting result Sd generated by performing a hard decision on the output signal $S_{OUT1}$, which will cause the error propagation problem. The present invention inputs the output signal $S_{OUT1}$ without processing by the slicer 140 to the IIR filter 150, and then the backend can utilize a simple decoder 180 (e.g. a Viterbi decoder) to perform a decoding operation, thereby decreasing the complexity and circuit area of the decoder 180. Moreover, due to the use of the front-end feed-forward equalizer 120 in conjunction with the IIR filter 150, the decoder 180 can derive a best decoding gain (i.e., a best solution of the Maximum likelihood sequence estimation (MLSE)) without being interfered with by the inter symbol interference (ISI) phenomenon. For example, the MLSE of the communication signal receiver 100 (with the IIR filter 150 implemented therein) of the present invention can derive a 6 dB decoding gain, but the MLSE of the conventional communication signal receiver (with the decision feedback sequence estimator (DFSE) implemented therein) can only derive a 3.5 dB decoding gain. Although the IIR filter 150 will cause noise enhancement (about 1.5 dB), the total system performance will still be improved and the structure of the present invention is much simpler.

The communication signal receiver structure having the IIR filter 150 implemented therein has a convergence problem. In the convergence procedure, the IIR filter 150 will be unable to converge because the slicer 140 does not limit the signal around a correct solution. Therefore, the present invention utilizes an alternative design to solve this problem.

Figure 2:
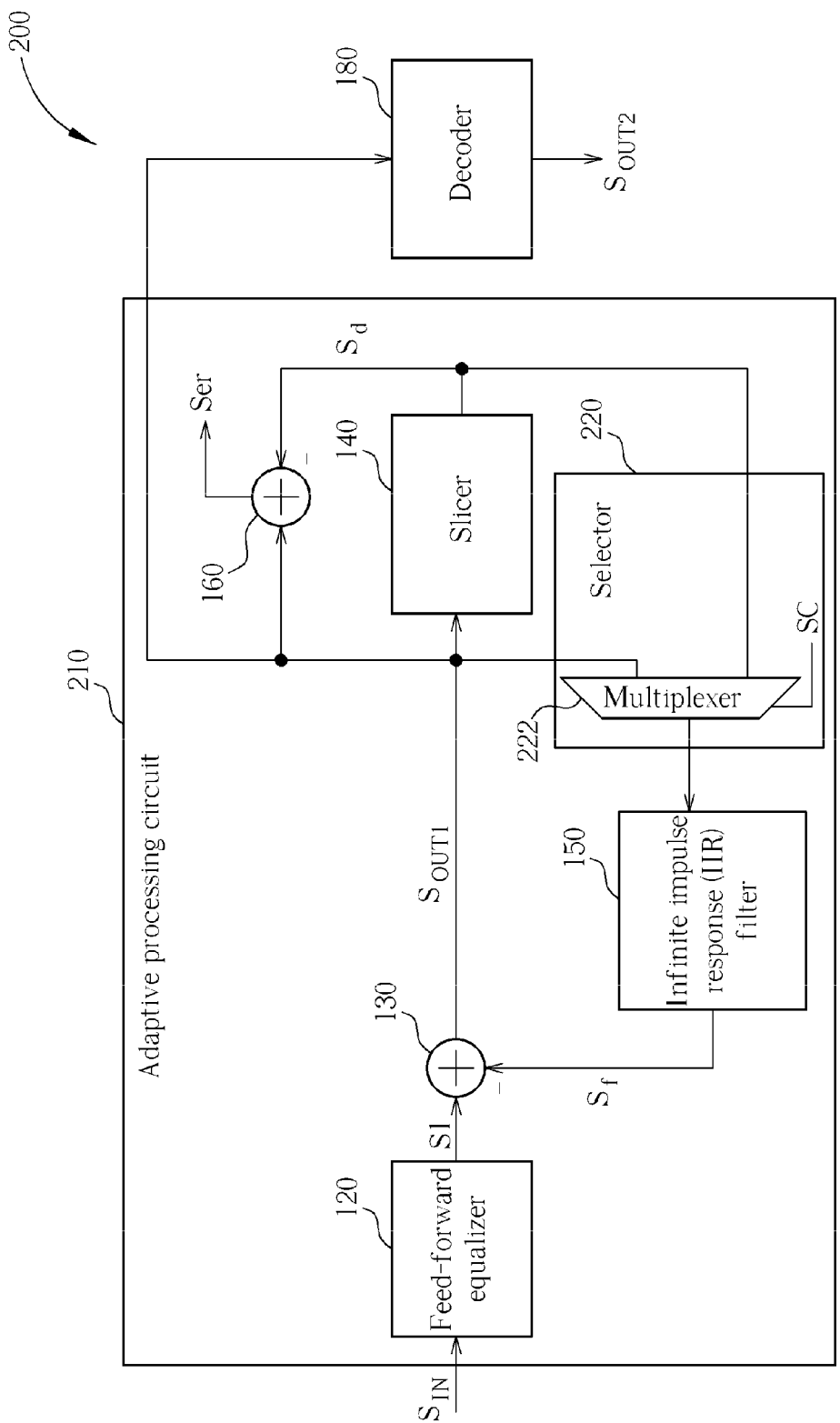
FIG. 2 is a diagram of a communication signal receiver according to a second embodiment of the present invention.

Please refer to FIG. 2. FIG. 2 is a diagram illustrating a communication signal receiver 200 according to a second exemplary embodiment of the present invention. The communication signal receiver 200 shown in FIG. 2 is similar to the communication signal receiver 100 shown in FIG. 1. The difference between the communication signal receiver 200 and the communication signal receiver 100 is that an adaptive processing circuit 210 of the communication signal receiver 200 further includes a selector 220 coupled to the slicer 140 and the IIR filter 150. In this embodiment, the selector 220 is implemented by a multiplexer 222, but this is not meant to be a limitation of the present invention. Using another type of selector, such as a switch, also falls within the scope of the present invention. The multiplexer 222 selectively outputs the output signal $S_{OUT1}$ or the detecting result Sd to the IIR filter 150 according to a control signal SC, wherein when the multiplexer 222 outputs the output signal $S_{OUT1}$ to the IIR filter 150, the IIR filter 150 will process the output signal $S_{OUT1}$ to generate the filtered signal Sf, and when the multiplexer 222 outputs the detecting result Sd to the IIR filter 150, the IIR filter 150 will process the detecting result Sd to generate the filtered signal Sf.

Please note that the selector 220 can output the detecting result Sd to the IIR filter 150 first and then output the output signal $S_{OUT1}$ to the IIR filter 150 according to the control signal SC. For example, in the convergence procedure, the selector 220 can output the detecting result Sd to the IIR filter 150; and when the convergence procedure is finished, the selector 220 can output the output signal $S_{OUT1}$ to the IIR filter 150. Thus, the IIR filter 150 will be able to converge successfully. The switching timing of the selector 220 can be set by referring to a defined convergence time specified in the IEEE802.3 standard, as long as the switching timing does not exceed the defined convergence time.

The aforementioned embodiments are for illustrative purposes only, and in no way should be considered to be limitations of the scope of the present invention. It will be obvious to those skilled in the art that various modifications of the communication signal receivers 100, 200 may be made without departing from the spirit of the present invention.

Figure 3:
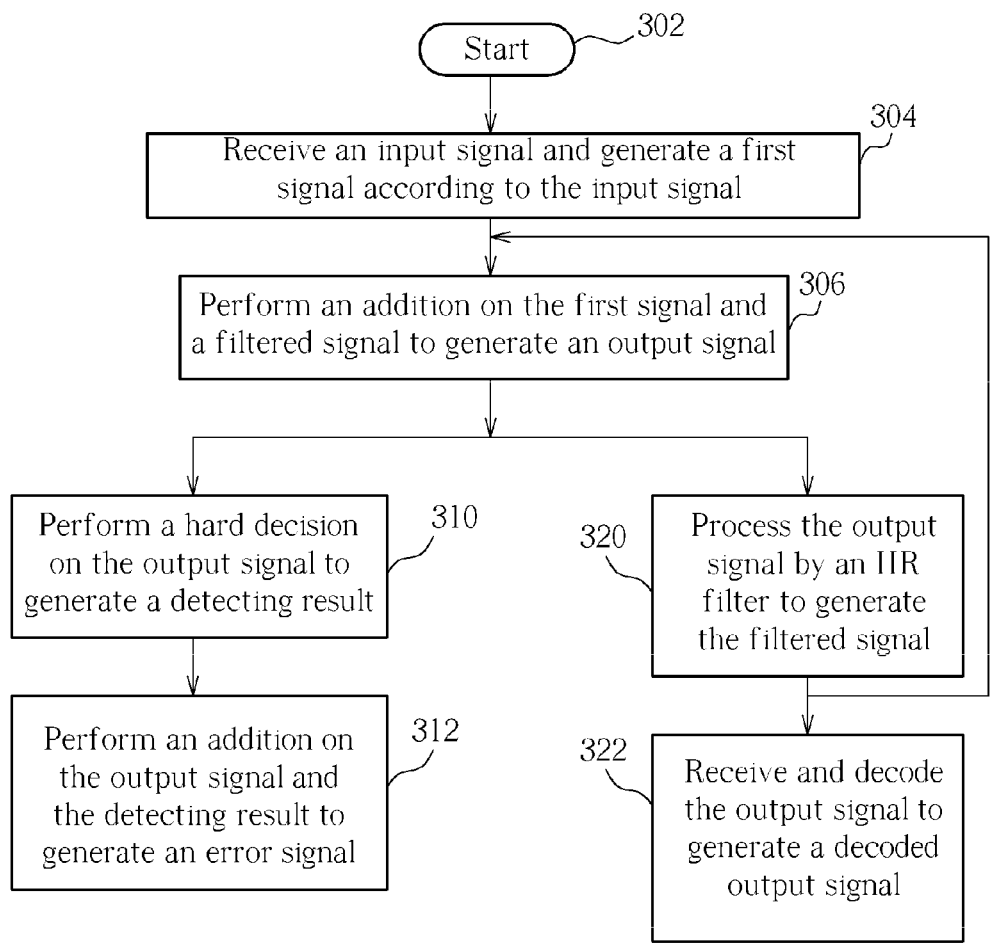
FIG. 3 is a flowchart of a signal processing method employed in a communication signal receiver according to an embodiment of the present invention.

Please refer to FIG. 3. FIG. 3 is a flowchart illustrating a signal processing method employed in a communication signal receiver according to an exemplary embodiment of the present invention. Please note that, provided the same result is substantially achieved, the steps of the flow shown in FIG. 3 need not be in the exact order shown and need not be contiguous. The exemplary signal processing method includes the following steps:

Step 302: Start.

Step 304: Receive an input signal and generate a first signal according to the input signal.

Step 306: Perform an addition on the first signal and a filtered signal to generate an output signal.

Step 310: Perform a hard decision on the output signal to generate a detecting result.

Step 312: Perform an addition on the output signal and the detecting result to generate an error signal.

Step 320: Process the output signal to generate the filtered signal.

Step 322: Receive and decode the output signal to generate a decoded output signal.

Please refer to the steps shown in FIG. 3 in conjunction with the elements shown in FIG. 2. As those skilled in this art can easily understand the operations of steps 302-322 of the exemplary signal processing method after reading the disclosure of the above-mentioned embodiments, full details are omitted here for brevity. Specifically, step 304 is executed by the feed-forward equalizer 120, step 306 is executed by the first adder 130, step 310 is executed by the slicer 140, step 312 is executed by the second adder 160, the 320 is executed by the IIR filter 150 and step 322 is executed by the decoder 180.

The steps of the abovementioned flow are merely a practicable embodiment of the present invention, and in no way should be considered to be limitations of the scope of the present invention. The method can include other intermediate steps or can merge several steps into a single step without departing from the spirit of the present invention. For example, a selecting step can be added before the step 320 shown in FIG. 3, for realizing the functionality (i.e., selectively outputting the output signal $S_{OUT1}$ or the detecting result Sd to the IIR filter 150 according to a control signal SC) executed by the selector 220 shown in FIG. 2. In such a manner, the selector 220 can output the detecting result Sd to the IIR filter 150 in the convergence procedure; and when the convergence procedure is finished, the selector 220 can output the output signal $S_{OUT1}$ to the IIR filter 150. Thus, the IIR filter 150 will be able to converge successfully.

The exemplary embodiments mentioned above are presented merely for describing technical features of the present invention, and should not be considered as limitations of the scope of the present invention. The present invention provides a communication signal receiver and a related signal processing method, where an IIR filter is utilized to replace a conventional FE. The present invention inputs the output signal $S_{OUT1}$ that is not processed by the slicer 140 to the following IIR filter 150, and then the backend can utilize a simple decoder 180 (e.g. a Viterbi decoder) to perform a decoding operation, which reduces the complexity and circuit area of the decoder 180. In this way, the total system performance will be improved and the hardware structure of the present invention is much simpler. Additionally, the selector 220 (e.g. a multiplexer or a switch) can be implemented in the communication signal receiver, for switching signal inputs fed into the IIR filter 150 in different modes (e.g. in the convergence procedure or after the convergence procedure is finished), thus, the IIR filter 150 will be able to converge successfully.

Those skilled in the art will readily observe that numerous modifications and alterations of the device and method may be made while retaining the teachings of the invention.

What is claimed is:

1. A communication signal receiver, comprising:
   a first adder, performing an addition on a first signal and a filtered signal to generate an output signal;
   a slicer, coupled to the first adder, performing a hard decision on the output signal to generate a detecting result;
   an infinite impulse response (IIR) filter, coupled to the slicer and the first adder, processing the output signal to generate the filtered signal; and
   a selector, coupled to the slicer and the IIR filter, selectively outputting the output signal or the detecting result to the IIR filter according to a control signal, wherein when the selector outputs the output signal to the IIR filter, the IIR filter processes the output signal to generate the filtered signal, and when the selector outputs the detecting result to the IIR filter, the IIR filter processes the detecting result to generate the filtered signal;
   wherein the selector outputs the detecting result to the IIR filter first and then outputs the output signal to the IIR filter according to the control signal.

2. The communication signal receiver of claim 1, further comprising:
   a decoder, coupled to the first adder, receiving and decoding the output signal to generate a decoded output signal.

3. The communication signal receiver of claim 2, wherein the decoder is a Viterbi decoder.

4. The communication signal receiver of claim 1, wherein the selector is a multiplexer or a switch.

5. The communication signal receiver of claim 1, further comprising:
   a feed-forward equalizer, coupled to the first adder, receiving an input signal and generating the first signal according to the input signal.

6. The communication signal receiver of claim 1, further comprising:
   a second adder, coupled to the slicer, performing an addition on the output signal and the detecting result to generate an error signal.

7. The communication signal receiver of claim 1, wherein the communication signal receiver is applied in a 1 Gbase-T system or a 10 Gbase-T system.

8. A signal processing method employed in a communication signal receiver, the communication signal receiver comprising an infinite impulse response (IIR) filter, the method comprising:
   performing an addition on a first signal and a filtered signal to generate an output signal;
   performing a hard decision on the output signal to generate a detecting result;
   processing the output signal by the IIR filter to generate the filtered signal; and
   selectively outputting the output signal or the detecting result to the IIR filter according to a control signal, wherein when the output signal is outputted to the IIR filter, the IIR filter processes the output signal to generate the filtered signal, and when the detecting result is outputted to the IIR filter, the IIR filter processes the detecting result to generate the filtered signal;
   wherein the detecting result is outputted to the IIR filter first, and then the output signal is outputted to the IIR filter.

9. The method of claim 8, further comprising:
   receiving and decoding the output signal to generate a decoded output signal.

10. The method of claim 8, further comprising:
    receiving an input signal; and
    generating the first signal according to the input signal.

11. The method of claim 8, further comprising:
    performing an addition on the output signal and the detecting result to generate an error signal.

12. The method of claim 8, wherein the method is applied in a 1 Gbase-T system or a 10 Gbase-T system.

* * * * *